(12) United States Patent
Xue

(10) Patent No.: US 8,297,571 B2
(45) Date of Patent: Oct. 30, 2012

(54) DISPLAY HANGING STRUCTURE

(75) Inventor: Embay Xue, Zhonghe (TW)

(73) Assignee: Top Victory Investments Ltd., Harbour (HK)

( * ) Notice: Subject to any disclaimer, the term of this patent is extended or adjusted under 35 U.S.C. 154(b) by 289 days.

(21) Appl. No.: 12/814,652

(22) Filed: Jun. 14, 2010

(65) Prior Publication Data

US 2011/0303810 A1    Dec. 15, 2011

(51) Int. Cl.
*E04G 3/00* (2006.01)

(52) U.S. Cl. .................. 248/220.22; 248/475.1; 248/493

(58) Field of Classification Search ............. 248/220.22, 248/475.1, 479, 489, 490, 222.14, 224.8, 248/917, 493, 497
See application file for complete search history.

(56) References Cited

U.S. PATENT DOCUMENTS

| | | | |
|---|---|---|---|
| 7,819,616 B2 * | 10/2010 | Silverbrook | 412/37 |
| 7,883,069 B2 * | 2/2011 | Park et al. | 248/328 |
| 2005/0072894 A1 * | 4/2005 | Grant | 248/475.1 |
| 2006/0266900 A1 * | 11/2006 | May et al. | 248/220.22 |
| 2008/0083865 A1 * | 4/2008 | Matsui | 248/496 |
| 2009/0050775 A1 * | 2/2009 | Constantinou et al. | 248/489 |
| 2009/0206214 A1 * | 8/2009 | David | 248/205.1 |

* cited by examiner

*Primary Examiner* — Ramon Ramirez
(74) *Attorney, Agent, or Firm* — Alan Kamrath; Kamrath IP Lawfirm, PA

(57) ABSTRACT

A display hanging structure hangs a display on the wall. The display has a rear portion, and the display hanging structure includes at least two hangers, a shaft and at least one fixing block. The hangers are disposed at the rear portion, and each hanger has a hole disposed at an identical altitude comparative to the other hole. The shaft is axial shaped and is disposed in the holes. The fixing block is disposed on the wall and contains a slot for receiving the shaft. Whereby, the display may be firmly stuck on the wall by placing the shaft in the slots.

14 Claims, 8 Drawing Sheets

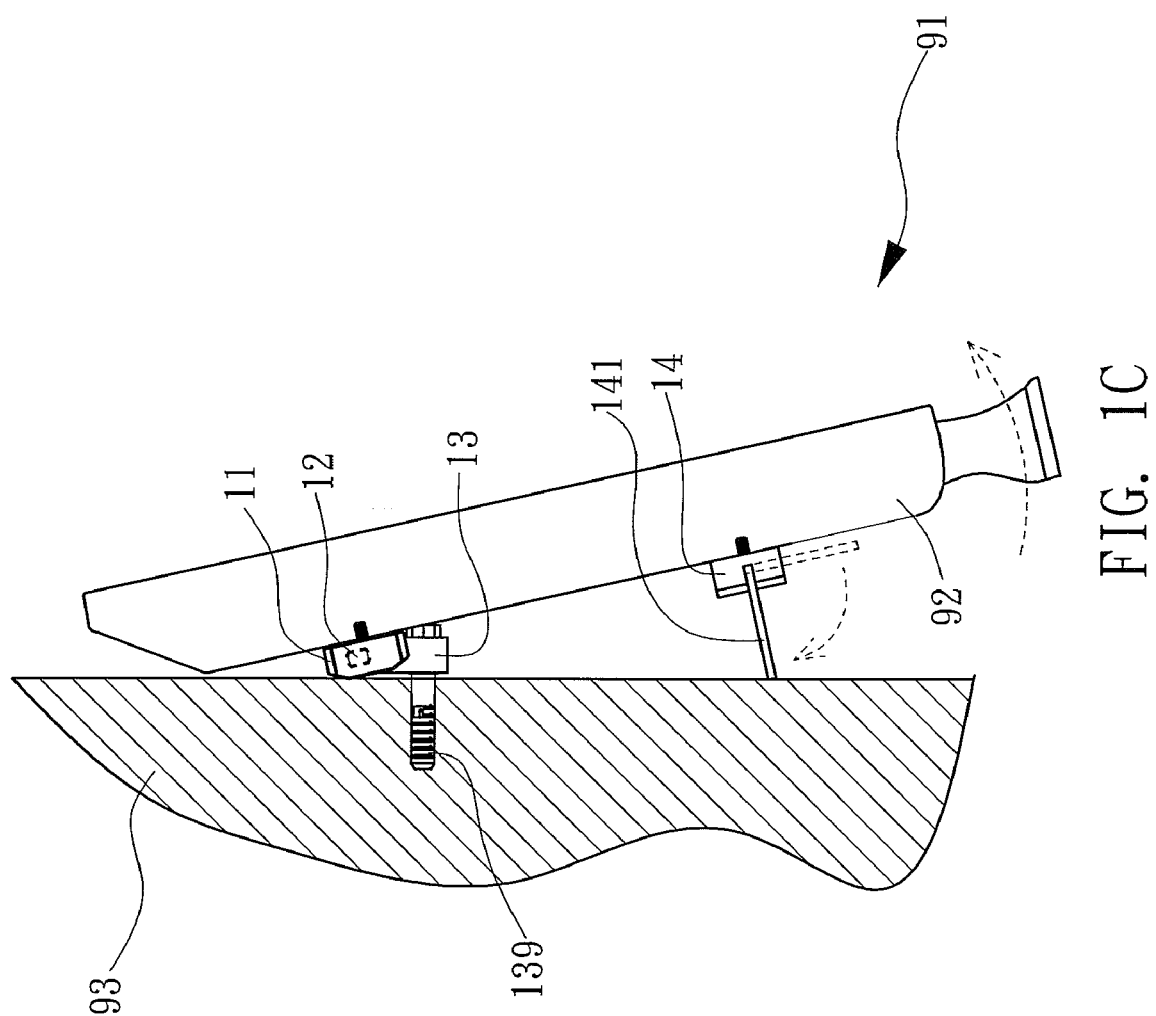

DISPLAY HANGING STRUCTURE

FIELD OF THE INVENTION

The present invention relates to a hanging structure and, particularly, to a thin type display hanging structure.

DESCRIPTION OF THE PRIOR ART

In recent years and due to the lower and lower manufacturing cost, the flat panel display serving as a TV or computer screen has become mainstream for years. Moreover, because of its weightless and thin character comparative to the cathode-ray tube (CRT) TV, the flat panel display has also come into vogue such as in stations, hospitals, convenience stores, theaters or other public places. The flat panel display is used in public not only for presenting the message, but also for advertising purposes. Thus, the business application of the flat panel display is absolutely broader and broader.

Conventionally, when hung on the wall, the flat panel display normally takes advantage of a frame or other supporting structures, so that the flat panel display may be stuck and fixed on the wall by the mechanical structure of the frame, and then kept a distance away from the wall. Therefore, the distance between the wall and the flat panel display could be used for plugging the wires or cables.

However, the frame or supporting structure is normally thick to sustain the heavy flat panel display. Therefore, the frame or supporting structure would looks bulky, massive and space-wasted. Furthermore, the frame or supporting structure of the display is troublesome for installing or disassembling. Namely, the flat panel display needs to be entirely lifted, and, then, the wires or cables might have a chance to be plugged or removed. It would be absolutely inconvenient.

Therefore, how to resolve the shortcomings of a thick and bulky frame, of improving regulation of the flat panel display and of plugging or removal of the wires and cables, remains a critical issue needed to be settled.

SUMMARY OF THE INVENTION

The primary object of the present invention is to resolve the shortcomings of a thick and bulky frame of the display.

Another object of the present invention is to improve regulation of the display and plugging or removal of the wires and cables.

To achieve the foregoing and other objects, a display hanging structure for hanging a display on the wall is provided. The display has a rear portion, and the display hanging structure comprises at least two hangers, a shaft and at least one fixing block. The hangers are disposed at the rear portion, and each hanger has a hole disposed at an identical altitude comparative to the other hole. The shaft is axial shaped and is disposed in the holes. The fixing block is disposed on the wall and contains a slot for receiving the shaft. Whereby, the display may be firmly stuck on the wall by placing the shaft in the slots.

In one preferable embodiment of the display hanging structure, the hanger is fixed on the rear portion of the display by screws or hooks.

In another embodiment of display hanging structure, the hangers are disposed at an identical altitude.

In another embodiment of display hanging structure, the shaft is tightly fitted in the holes.

In another embodiment of display hanging structure, the shaft is tightly fitted in the slot.

In another embodiment of display hanging structure, the fixing block further contains at least one flexible hook disposed nearby the slot. The hook might prevent the shaft from radial moving when the shaft is disposed in the slot, and the hook abuts upon the shaft when the shaft is disposed in the slot.

In another embodiment of display hanging structure, two ends of the slot along the direction of the axis of the shaft are at an identical altitude.

In another embodiment of display hanging structure, the number of fixing blocks is a plurality, and the pluralities of slots are at an identical altitude.

In another embodiment of display hanging structure, at least one spacer is disposed at the rear portion and beneath of the hanger. The thickness of the spacer and the thickness of the hanger are the same, the spacer is firmly fixed at the rear portion by a screw, the spacer further contains a bracket rotating around the spacer, and the bracket is parallel to or perpendicular to the rear portion by rotation.

In another embodiment of display hanging structure, at least one spacer is disposed on the wall and beneath of the fixing block. The thickness of the spacer and the thickness of the fixing block are the same, the spacer is firmly fixed on the wall by a screw, the spacer further contains a bracket rotating around the spacer, and the bracket is parallel to or perpendicular to the wall by rotation.

In another embodiment of display hanging structure, the fixing block is firmly fixed on the wall by a screw.

Whereby, the display hanging structure might resolve the shortcomings of a thick and bulky frame of the display. Moreover, it may improve regulation of the display and meliorate plugging or removal of wires and cables.

The foregoing, as well as additional objects, features and advantages of the invention will be more readily apparent from the following detailed description, which proceeds with reference to the accompanying drawings.

BRIEF DESCRIPTION OF THE DRAWINGS

FIG. 1C is a diagram depicting the display hanging structure hung tilted on the wall;

DESCRIPTION OF THE PREFERRED EMBODIMENTS

Figure 1A:
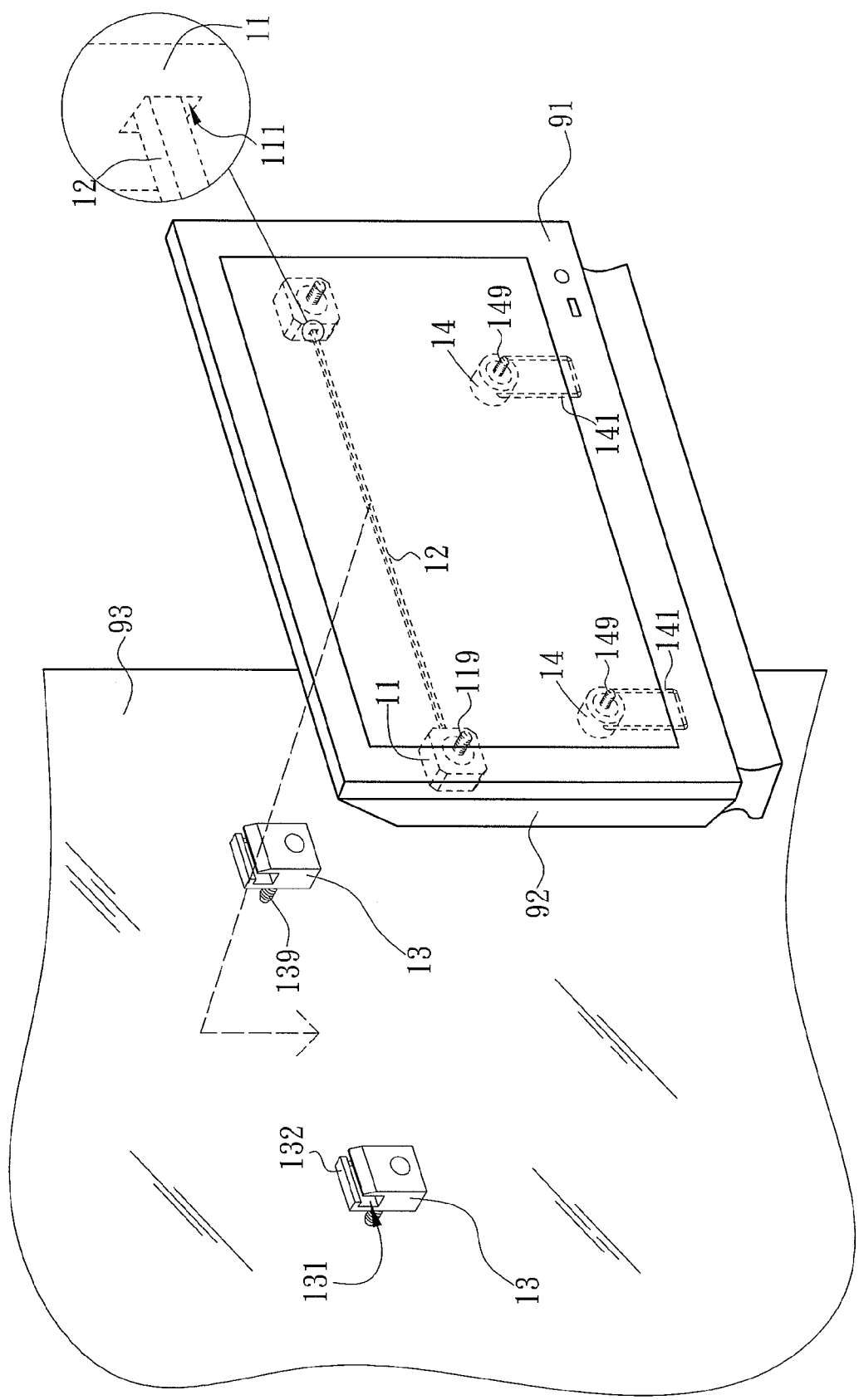
FIG. 1A is a diagram of a display hanging structure according to the first embodiment of the present invention.

As shown in FIG. 1A, a display hanging structure is used for hanging a display 91 on the wall 93. The display 91 includes a rear portion 92. The display 91 is hung on the wall 93 by fixing the rear portion 92 on the wall 93 and letting the display 91 face opposite of the wall 93. The display hanging structure contains two hangers 11, a shaft 12, two fixing blocks 13 and two spacers 14. The hangers 11 are firmly fixed and disposed at the rear portion 92 of the display 91, and kept at the same altitude. Configuration of the shaft 12 is long axial-shaped. As shown in an enlarged diagram of FIG. 1A, each hanger 11 contains a hole 111. The shaft 12 is disposed in the hole 111. In preferable embodiment, the shaft 12 is inserted into the hole 111 by tightly fitting in the hole 111. If so, the shaft 12 will not swing any more. Additionally, in this embodiment, the pluralities of holes 111 are also at an identical altitude so that two ends of the shaft 12 may be horizontally disposed at the rear portion 92 of the display 91 by placing the shaft 12 in the hole 111. At the back beneath of the display 91, two spacers 14 are firmly fixed and screwed on the rear portion 92 by the screw 149. Two spacers 14 are disposed beneath the hanger 11. Each spacer 14 contains a bracket 141, and the bracket 141 rotates around the spacer 14. Thus, the bracket 141 can be parallel to or perpendicular to the rear portion 92 by rotation. Additionally, the hanger 11 is also firmly fixed and screwed at the rear portion 92 of the display 91 by taking advantage of the screw 119. Besides, those skilled in the art might replace the screw with a hook. Namely, the hanger 11 might be fixed at the rear portion 92 by taking advantage of the hook (not shown).

Two fixing blocks 13 are firmly fixed and screwed on the wall 93 by the screw 139. Each fixing block 13 contains a slot 131 and a hook 132. The slot 131 might receive the shaft 12. The hook 132 could have flexibility and is disposed near the slot 131. The slots 131 of the two fixing blocks 13 are disposed at an identical altitude. In this embodiment, the hook 132 is disposed near the opening of the slot 131 and approximately encircles the slot 131.

Figure 1B:
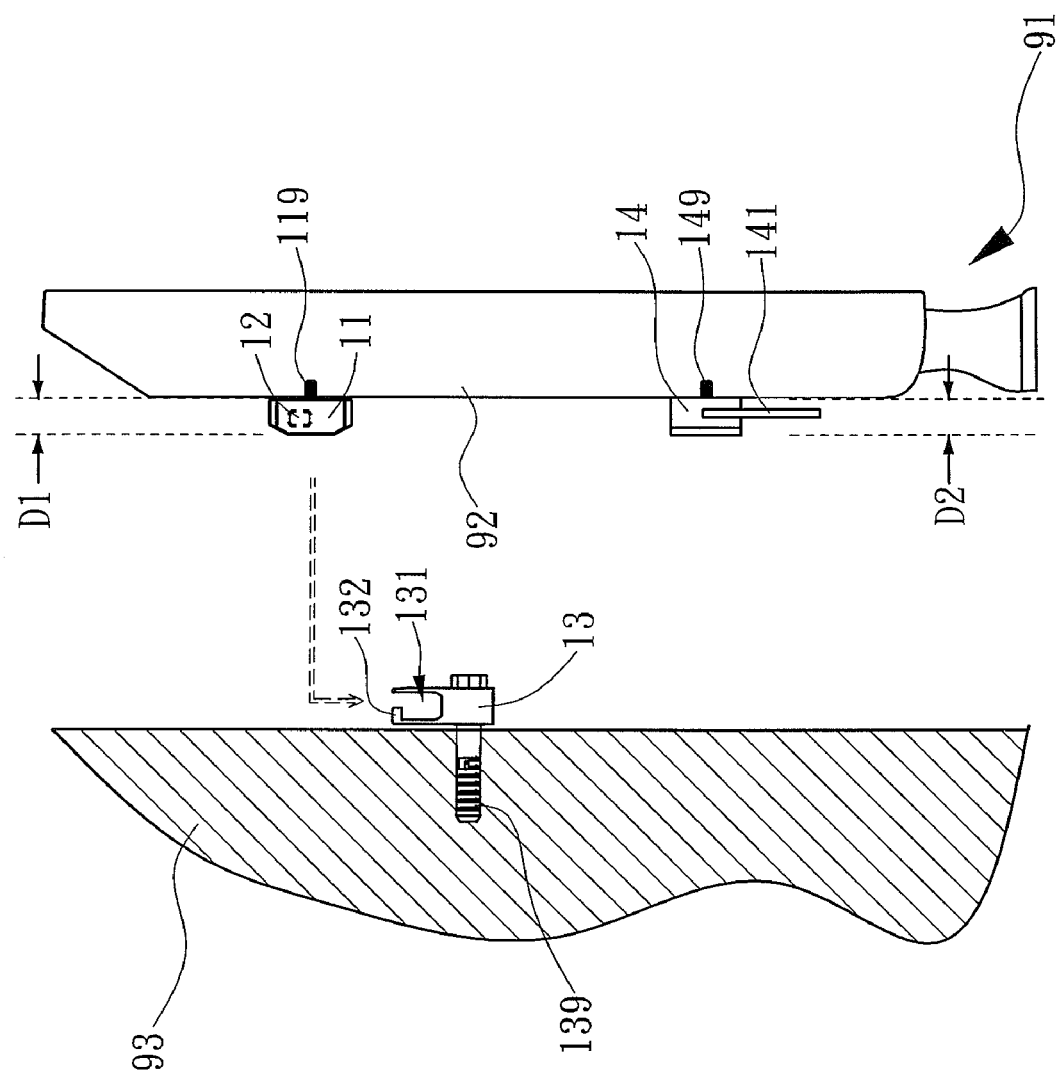
FIG. 1B is a diagram depicting the display hanging structure hung on the wall.

As shown in FIG. 1B, when hanging the display 91 on the wall 93 is needed, the process is aligning the rear portion 92 of the display 91 to the top of the two fixing blocks 13, and moving the display 91 downward vertically. Then, the shaft 12 may pass through hooks 132 of the two fixing blocks 13, so that the shaft 12 may enter the slots 131. In a preferable case, the hooks 132 could have flexibility to let the shaft 12 easily pass through the hook 132, by swinging the hooks 132. When the shaft 12 is located in the slot 131, the hook 132 may prevent the shaft 12 from moving in a radial direction. Namely, the hook 132 could resist the vertical movement of the shaft 12 and the display 91, in case the display 91 might fall down due to external shaking. Moreover, the thickness D1 of the hanger 11 is equal to the thickness D2 of the spacer 14. Thus, the display 91 may be held vertically without tilting when hung on the wall 93. Meanwhile, the bracket 141 is parallel to the rear portion 92 of the display 91. Then, due to the thin hanger 11 and spacer 14 and where the thickness D1 of hanger 11 and the thickness D2 of spacer 14 are nothing more than several centimeters, the display 91 might be close to the wall 93. It would achieve a thin-type with grace and, thus, saving space. Therefore, the display 91 might be firmly stuck on the wall 93 by disposing the shaft 12 inside the slots 131.

FIG. 1C is a diagram depicting the display hanging structure hung tilted on the wall. If removing the plug (not shown) from the rear portion 92 is needed, what is needed is counterclockwise rotating the display 91 against the shaft 12, and clockwise rotating the bracket 141 against the spacer 14 until the bracket 141 is perpendicular to the rear portion 92. Then, the bracket 141 can abut upon the wall 93. As shown in FIG. 1C, a space is presented between the rear portion 92 and the wall 93, which might allow the removal or plugging of wires and cables located behind the display 91. After the plug, the bracket 141 could be rotated counterclockwise, so that the bracket 141 is parallel to the rear portion 92 again. Thus, the display 91 could be returned to a vertical state without tilting.

Figure 1D:
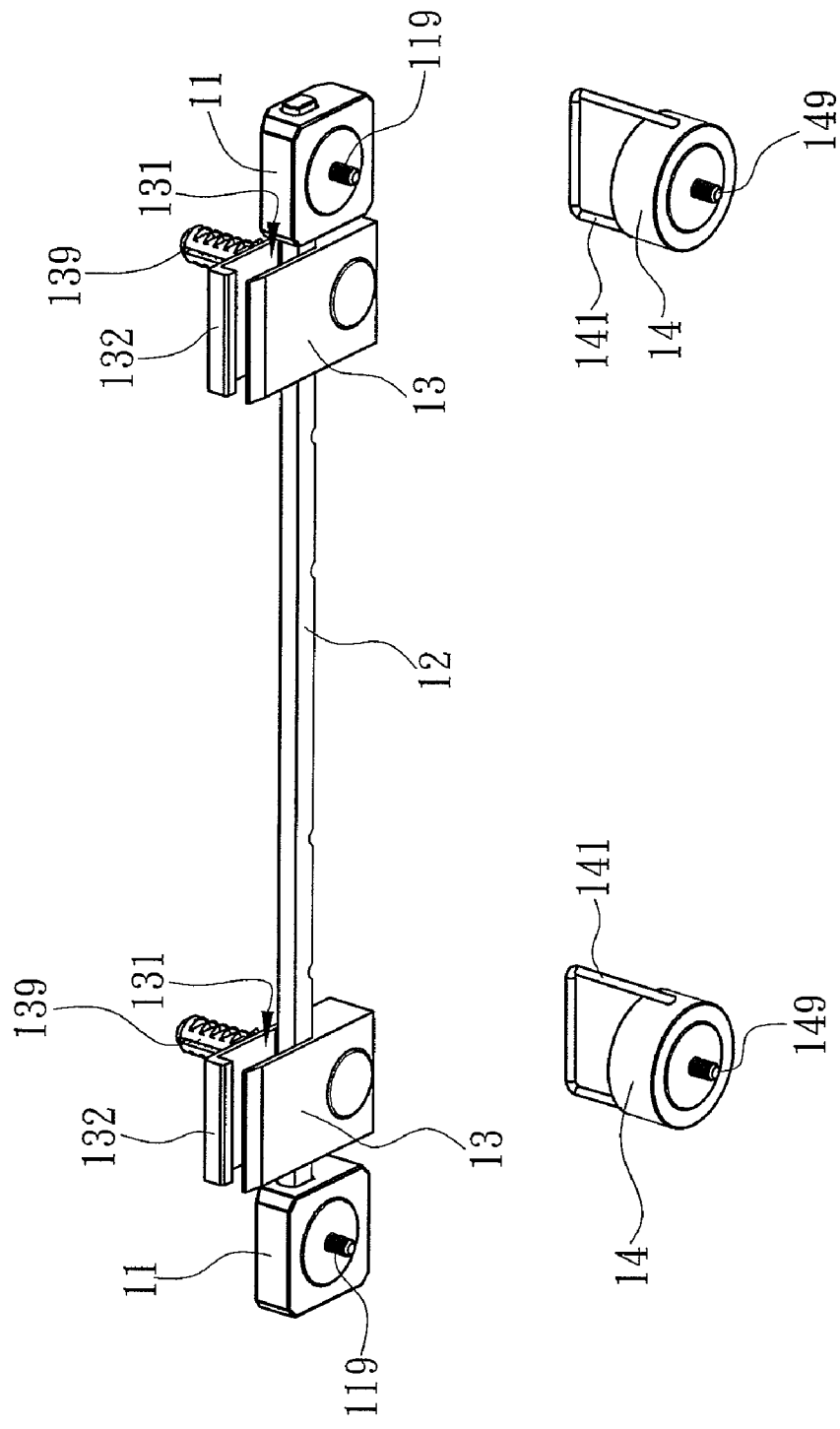
FIG. 1D is a diagram of a hanger, shaft, fixing block and spacer of the display hanging structure.

FIG. 1D clearly discloses the configuration of the hanger 11, shaft 12, fixing block 13 and spacer 14. When the shaft 12 is disposed inside the slots 131 of the fixing blocks 13, the two hangers 11 are located outside of the two fixing blocks 13.

Figure 2:
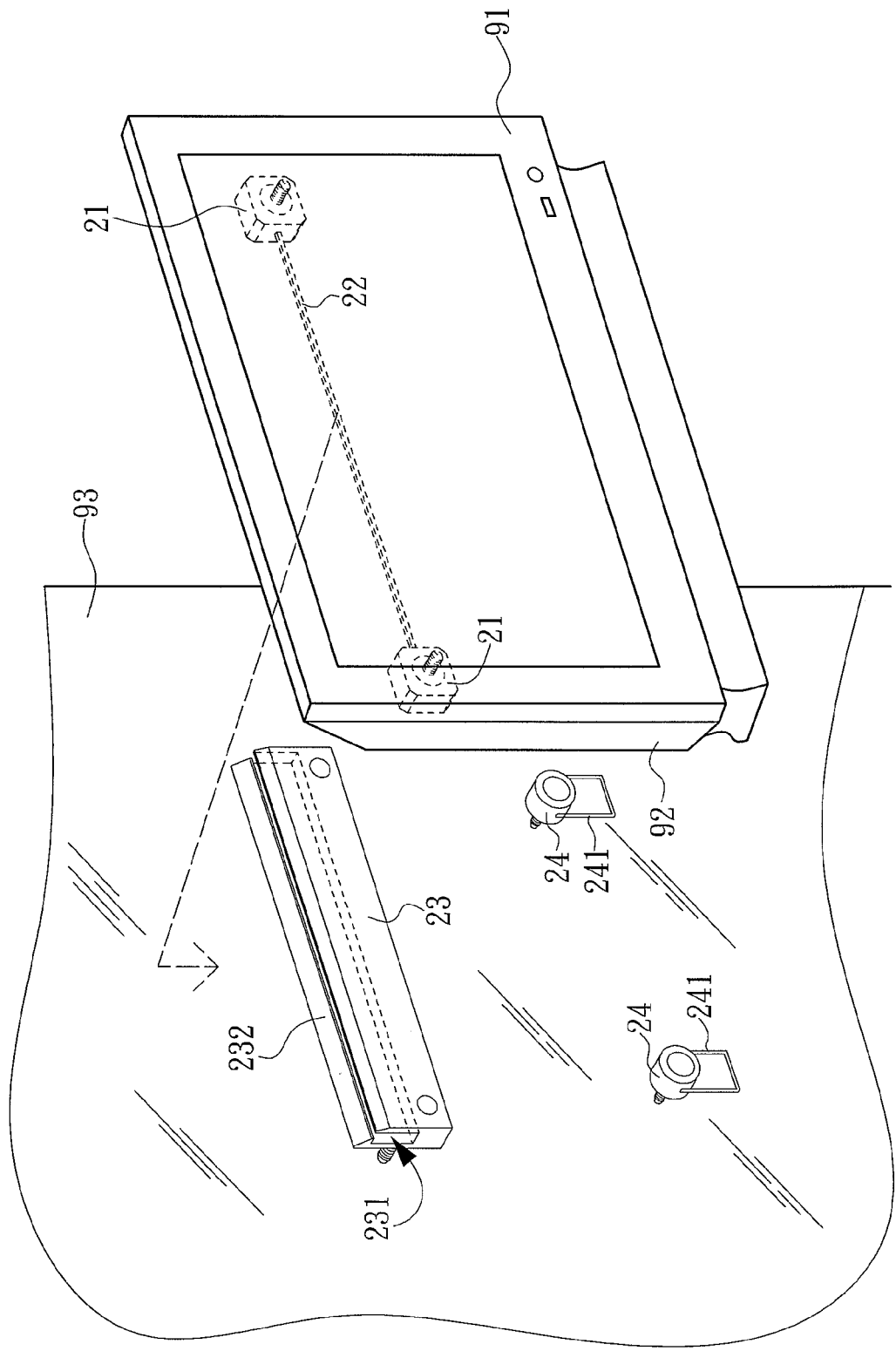
FIG. 2 is a diagram of a display hanging structure according to the second embodiment of the present invention.

As shown in FIG. 2, the display hanging structure includes two hangers 21, a shaft 22, a fixing block 23 and two spacers 24. Each spacer 24 contains a bracket 241. The fixing block 23 is a long-shaped structure, so that the hook 232 and the slot 231 are also long-shaped structures. In addition, two ends of the slot 231 along the direction of the axis of the shaft 22 are at an identical altitude. As a result, when the display 91 is hung by hanging the shaft 22 inside the slot 231, the display 91 might stay in an exact horizontal level.

Figure 3:
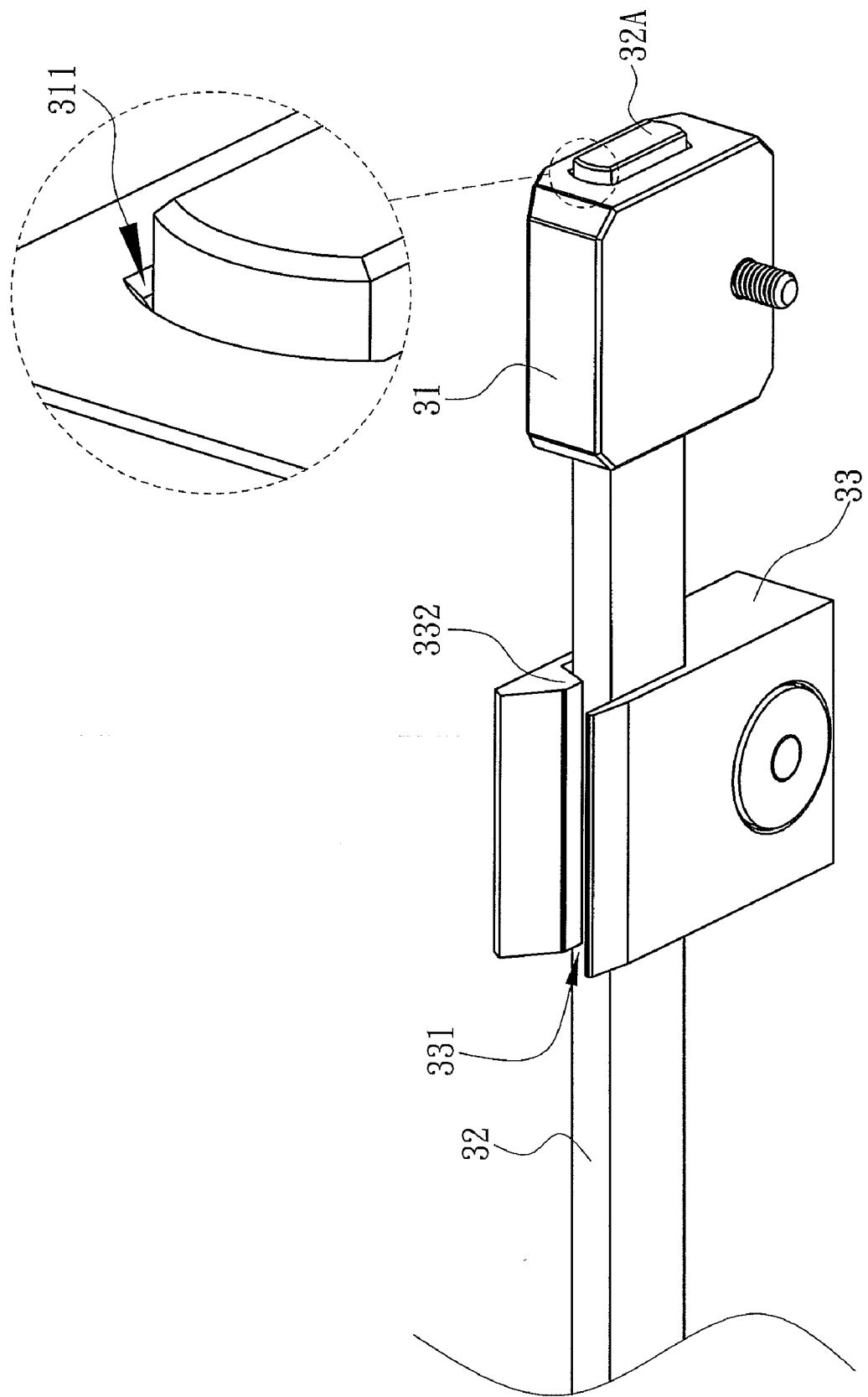
FIG. 3 is a diagram of a hanger, shaft and fixing block according to the third embodiment of the present invention.

As shown in FIG. 3, when the shaft 32 is disposed inside the slot 331 of the fixing block 33, the shaft 32 is tightly fitted to the slot 331 and abutted upon by the hook 332. Thus, the combination strength of the configuration is reinforced, and the shaft 32 will not swing. Furthermore, as shown in an enlarged diagram of FIG. 3, the hole 311 penetrates the hanger 31. Thus, the end 32A of the shaft 32 may be disposed in the hole 311 by passing through the hole 311. In the preferable embodiment, the shaft 32 is tightly fitted to the hole 311, so that the shaft 32 will not horizontally move against the hanger 31.

Figure 4A:
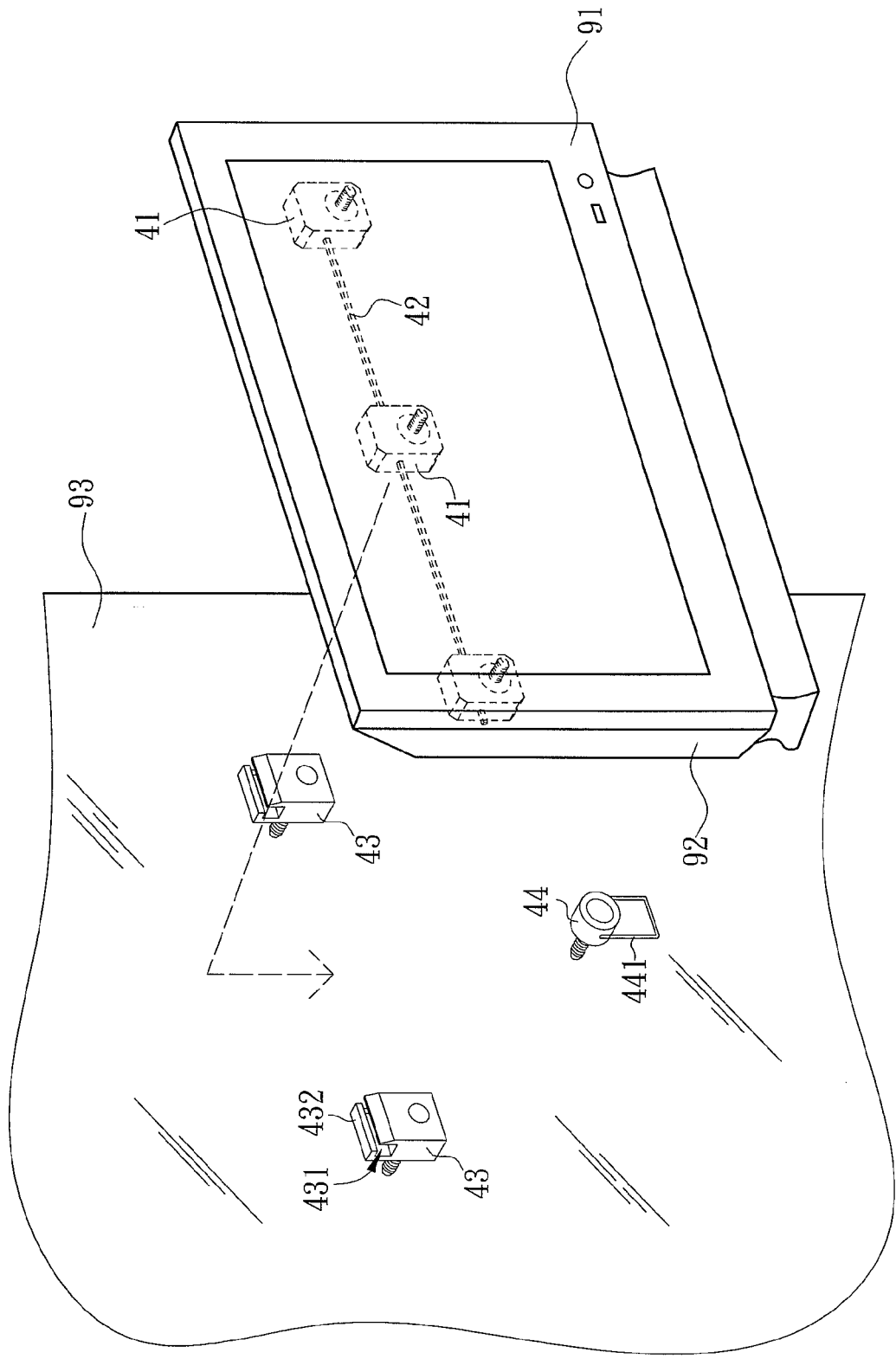
FIG. 4A is a diagram of a display hanging structure according to the fourth embodiment of the present invention.
Figure 4B:
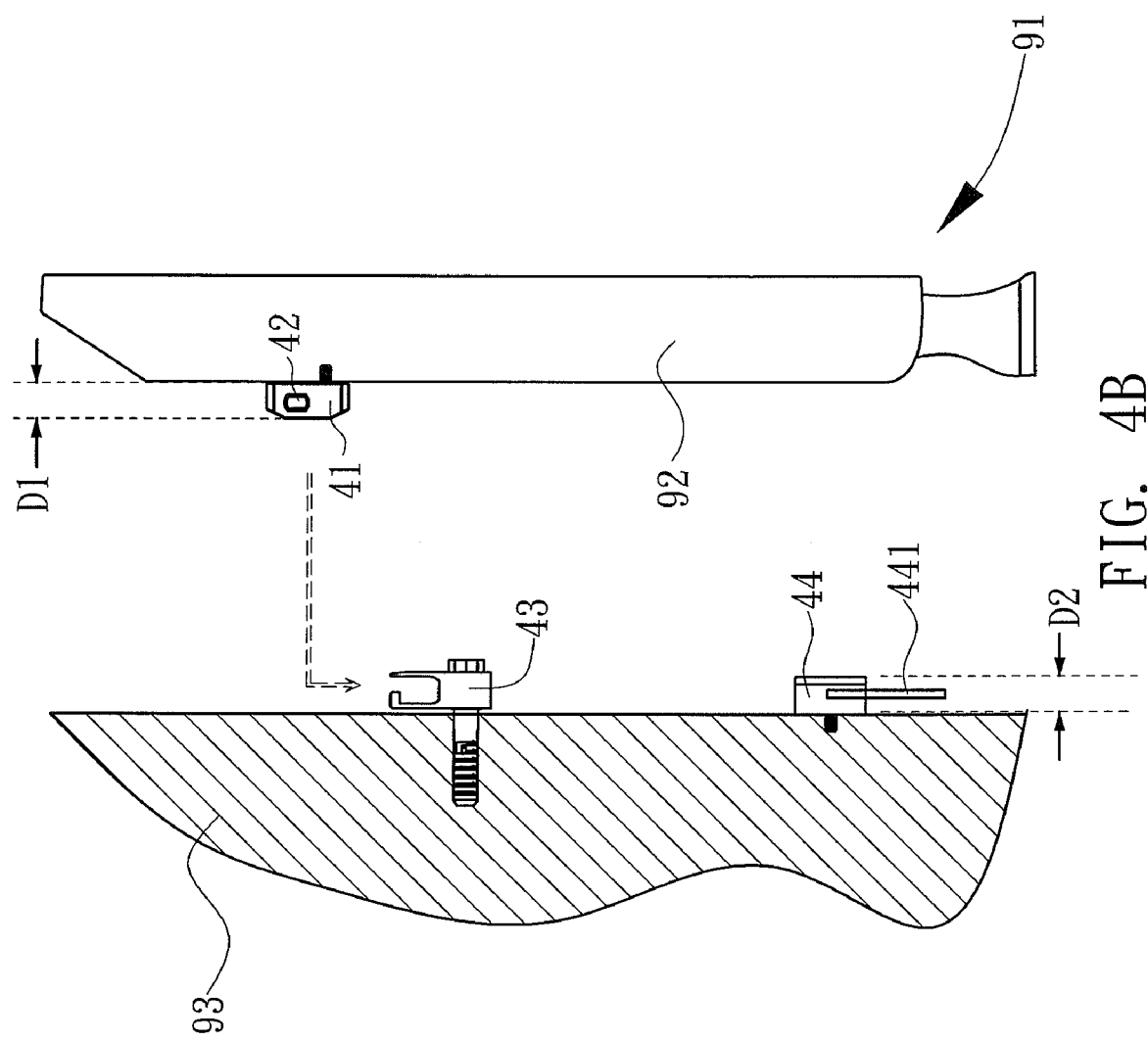
FIG. 4B is a side-view diagram of the display hanging structure according to the fourth embodiment of the present invention.

As shown in FIG. 4A, the display hanging structure includes three hangers 41, a shaft 42, two fixing blocks 43 and a spacer 44. Each fixing block 43 contains a slot 431 and a hook 432. Three hangers 41 are disposed in the left end, right end and intermediate zone of the shaft 42. Three hangers 41 may significantly increase contact sites while hanging the comparative wider display 91, and as a result the display hanging structure can be more stable. In this embodiment, the spacer 44 is firmly disposed on the wall 93 and beneath the fixing block 43. The bracket 441 might rotate around the spacer 44 to be perpendicular to or parallel to the wall 93 by rotation. If the bracket 441 is opened, it could be perpendicular to the wall 93 and, as a result, abut upon the rear portion 92 of the display 91. Therefore, the display 91 might be tilted, to conveniently remove or plug in wires and cables which are located behind the display 91. Referring to FIG. 4B, the thickness D1 of the hanger 41 is equal to the thickness D2 of the spacer 44, and as a result, the thin-type configuration is absolutely achieved.

Summarily, the display hanging structure might resolve the shortcomings of the thick and bulky frame of the display. Moreover, it may improve regulation of the display and meliorate plugging in or removal of wires and cables. Therefore, the display hanging structure of the present invention may have tremendous market potential.

While certain exemplary embodiments have been described and shown in the accompanying drawings, it is to be understood that such embodiments are merely illustrative of and not restrictive on the broad invention, and that this invention is not be limited to the specific constructions and arrangements shown and described, since various other modifications may occur to those ordinarily skilled in the art.

I claim:

1. A display hanging structure for hanging a display on the wall, with the display having a rear portion, the display hanging structure comprising:

two hangers disposed at the rear portion with each hanger having a hole disposed at an identical altitude comparative to the hole of the other hanger;

a shaft with an axial shape disposed in the holes of the two hangers;

at least one fixing block adapted to be disposed on the wall and containing a slot for receiving the shaft; and a spacer disposed at the rear portion and beneath the two hangers, wherein the spacer further contains a bracket rotating around the spacer, wherein the bracket is parallel to or perpendicular to the rear portion by rotation, wherein the display is firmly stuck on the wall by placing the shaft in the slot.

2. The display hanging structure of claim 1, wherein the hanger is fixed on the rear portion of the display by screws or hooks.

3. The display hanging structure of claim 1, wherein the shaft is tightly fitted in the holes of the two hangers.

4. The display hanging structure of claim 1, wherein the shaft is tightly fitted in the slot.

5. The display hanging structure of claim 1, wherein the at least one fixing block further contains at least one flexible hook disposed nearby the slot, and wherein the hook prevents the shaft from radial moving when the shaft is disposed in the slot.

6. The display hanging structure of claim 5, wherein the hook abuts upon the shaft when the shaft is disposed in the slot.

7. The display hanging structure of claim 1, wherein two ends of the slot along a direction of an axis of the shaft are at an identical altitude.

8. The display hanging structure of claim 1, wherein the number of the at least one fixing block is a plurality, and the pluralities of slots are at an identical altitude.

9. The display hanging structure of claim 1, wherein a thickness of the spacer and a thickness of each hanger are the same.

10. The display hanging structure of claim 1, wherein the spacer is firmly fixed at the rear portion by a screw.

11. The display hanging structure of claim 1, wherein the at least one fixing block is firmly fixed on the wall by a screw.

12. A display hanging structure for hanging a display on the wall, with the display having a rear portion, the display hanging structure comprising:
    two hangers disposed at the rear portion with each hanger having a hole disposed at an identical altitude comparative to the hole of the other hanger;
    a shaft with an axial shape disposed in the holes of the two hangers;
    at least one fixing block adapted to be disposed on the wall and containing a slot for receiving the shaft; and
    a spacer disposed on the wall and beneath the fixing block, wherein the spacer further contains a bracket rotating around the spacer, wherein the bracket is parallel to or perpendicular to the wall by rotation, wherein the display is firmly stuck on the wall by placing the shaft in the slot.

13. The display hanging structure of claim 12, wherein a thickness of the spacer and a thickness of the fixing block are the same.

14. The display hanging structure of claim 12, wherein the spacer is firmly fixed on the wall by a screw.

\* \* \* \* \*